Dec. 21, 1965  F. H. WILLIAMS  3,224,732

EQUIPMENT FOR PLACING CABLE IN CONDUITS

Filed Nov. 21, 1962  4 Sheets-Sheet 1

INVENTOR.
FRANK H. WILLIAMS
BY *Milford A. Juton*

Dec. 21, 1965  F. H. WILLIAMS  3,224,732
EQUIPMENT FOR PLACING CABLE IN CONDUITS
Filed Nov. 21, 1962  4 Sheets-Sheet 2

INVENTOR
Frank H. Williams

BY Milford A. Juden

ATTORNEY

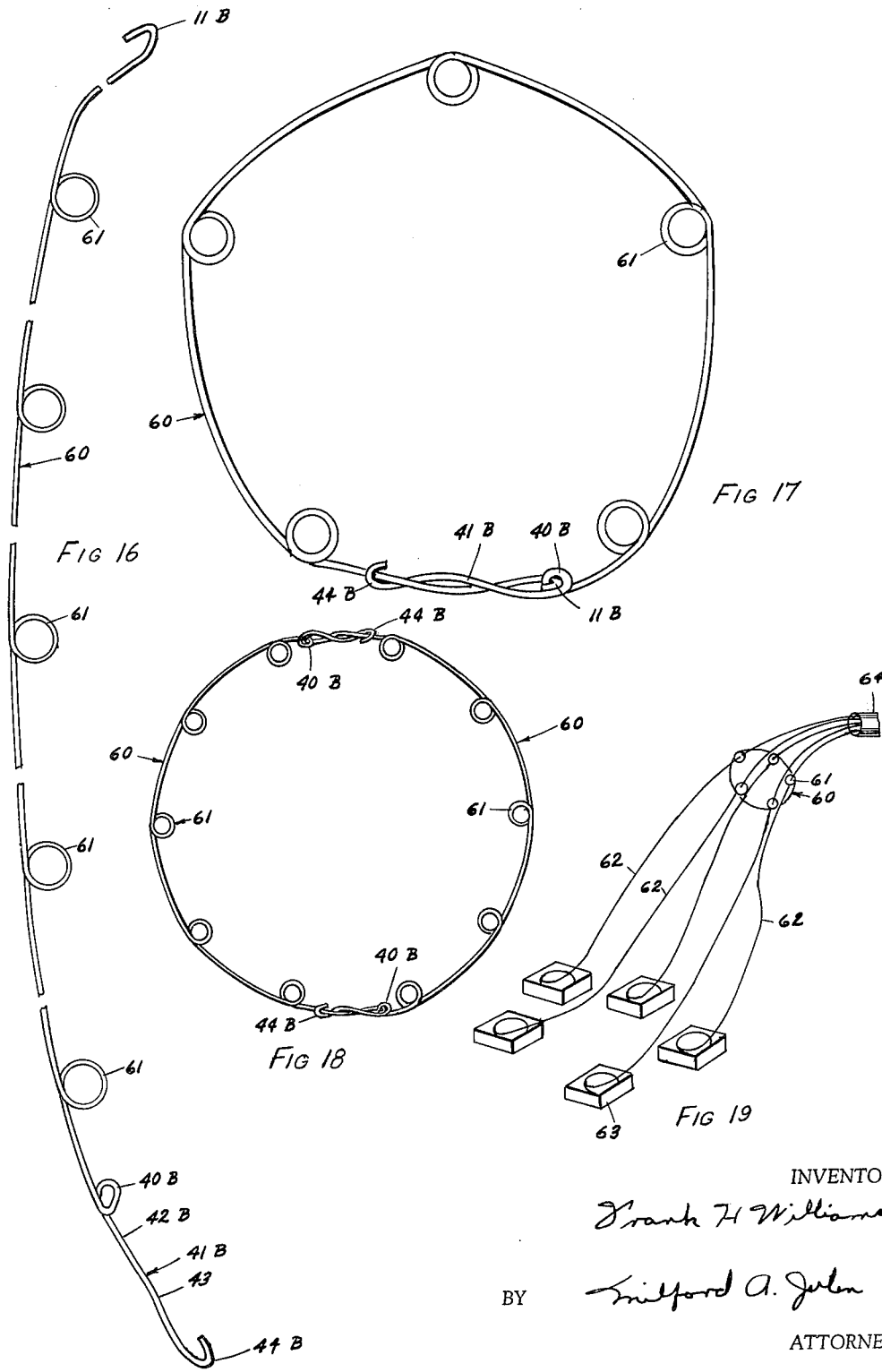

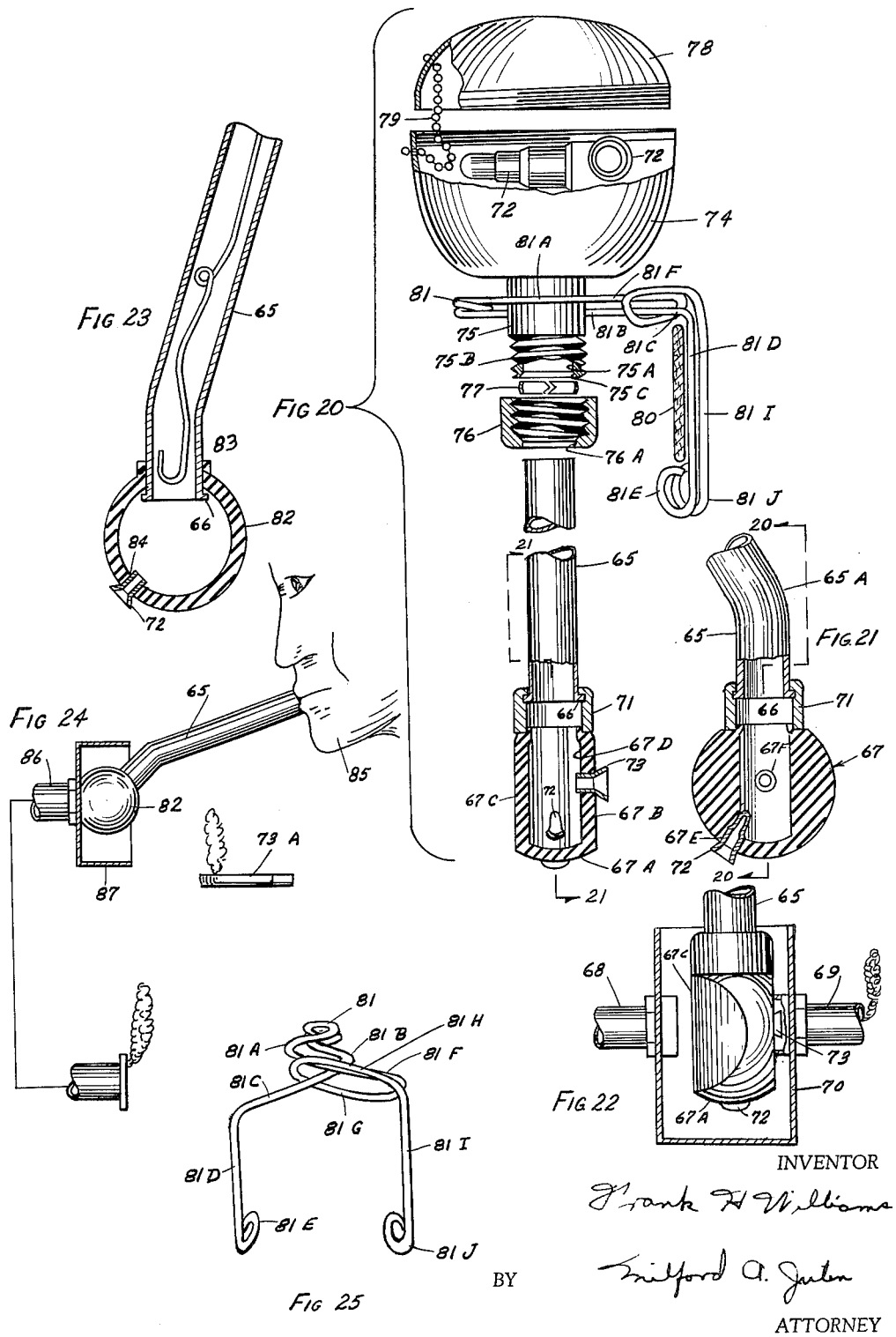

United States Patent Office

3,224,732
Patented Dec. 21, 1965

3,224,732
EQUIPMENT FOR PLACING CABLE IN CONDUITS
Frank H. Williams, 2310 Marshall St., Little Rock, Ark.
Filed Nov. 21, 1962, Ser. No. 239,182
3 Claims. (Cl. 254—134.3)

This application is a continuation-in-part of my prior application Ser. No. 112,658, filed May 25, 1961, now abandoned.

The present invention relates to equipment for assisting an electrician in installing wires in conduits, and particularly to the actual drawing of the wires into and through the conduits to connection boxes.

Heretofore it has been customary for electricians to use conventional snake or fish tape of relatively stiff resilient material having a hook bent on the end. Such a fish tape was pushed through a conduit to a connection box at which wires were secured to the hook and the wires drawn back through the conduit. Sometimes the conduit is so long or has so many bends that a fish tape cannot be pushed from one end to the other and it has been necessary to push a second fish tape from the other end and try to cause the hooks of the fish tapes to interengage so that pushing on one fish tape and pulling on the other will bring the end of one fish tape completely through. The wires are then attached to the hook of the one fish tape and drawn through the conduit by the pulling on the said one fish tape.

The problem of connecting the hooks of the two fish tapes in the conduit has been extremely difficult and has been largely a matter of chance that a connection would be made. Also fish tapes have been of excessive length and when one was broken it was necessary to get a new one. It has been difficult to guide several wires uniformly into a conduit without crossing of the wires and in some circumstances the wires could not be pulled through the conduits due to crossing of the wires. Also it has been difficult to carry the equipment and electrical connectors in low crawl spaces.

An object of the present invention is to overcome the problems enumerated above by providing equipment which can be used with present fish tapes for effectively accomplishing the work of installing wires in conduits with a minimum of labor and minimum cost and with a minimum of upsetting experiences due to failures.

An object of the present invention is to provide a connector attachment for a snake or fish tape whereby a first snake can be inserted as far as possible from one end and a second snake can be inserted from the other end and the adjacent portions of the snakes connected so that pulling on one snake while pushing on the other, the pushed snake will pass through the conduit and can be connected to a wire to be installed in the conduit, the wire being drawn through the conduit as the snake to which it is attached is withdrawn.

Another object is to provide a leader for a snake that will assist in guiding the hook end of a snake through a conduit in a pushing direction.

A further object is to provide a method of using snakes to assure that a wire can be installed in any conduit with a minimum of effort.

Another object is to provide means to connect two or more fish tapes both inside of a conduit or prior to insertion in a conduit thereby making it possible to use fish tapes of shorter lengths with attendant convenience and reduction of labor.

A further object is to provide equipment to locate the ends of particular conduits which location equipment also serves as a container and carrying case for electrical connectors and for the connection and wire guiding devices.

Another object is to provide a wire guide device which can be stored in a straight elongated condition and can be assembled with other guide devices for any number of wires to assure uniform accurate guiding of the wires to and through the conduit.

Other and further objects will be apparent as the description proceeds and upon reference to the accompanying drawing wherein:

FIG. 16 is a plan view with parts broken away showing the wire guide in condition for carrying and packaging.

FIG. 17 is a plan view of the wire guide of FIG. 16 in operative condition with the ends connected together by the interconnection structure of the invention.

FIG. 18 illustrates on a smaller scale two of the wire guides of the type shown in FIGS. 16 and 17 connected to guide twice as many wires.

FIG. 19 illustrates how the wire guide is employed to guide a plurality of wires from the wire packages in non-crossing and generally parallel relation into a conduit.

FIG. 20 is an exploded elevation with parts broken away, and parts in section showing a carrying device including a receptacle for electrical connectors and a container for fish tape connectors, wire lead pullers, and wire guides, and also serving as a smoke blower guide through which tobacco smoke may be blown into one end of an electrical conduit for locating the other end.

FIG. 21 is a fragmentary section taken on line 21—21 of FIG. 20 showing the swivel connection of the smoke blower head to the bent tubular body and also showing how one smoke outlet is closed by an electrical connector.

FIG. 22 illustrates how the shape of the smoke blower head permits insertion into an electrical connection box of limited size and showing smoke issuing from the remote end of the selected conduit.

FIG. 23 shows the smoke blower head of spherical form and how the smoke blower serves as a container for the elecrician's equipment of the present invention.

FIG. 24 illustrates one adjustment of the head on the tubular smoke blower body to facilitate the use thereof.

FIG. 25 is a perspective of the spring clamp for retaining the carrying device of the smoke blower and/or the electrical connector receptacle on the belt of an electrician providing all of the equipment in a convenient position even in narrow crawl spaces.

Figure 1:
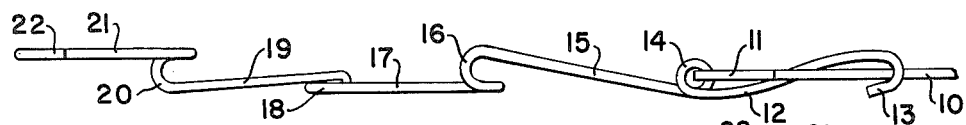
FIG. 1 is a top view of a connecting attachment to a snake or fish tape showing the detachable connection for the shank of the attachment including the eye on the shank of the attachment receiving the hook of the snake and a hook at the free end of the shank holding the shank wrapped around the snake.
Figure 2:
FIG. 2 is an end view of the free end of the connector attachment.
Figure 3:
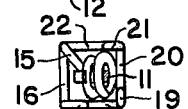
FIG. 3 is an end view of the shank end of the connector attachment.
Figure 4:
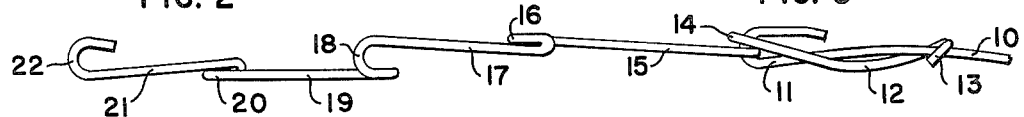
FIG. 4 is a side view of the structure of FIG. 1.
Figure 5:
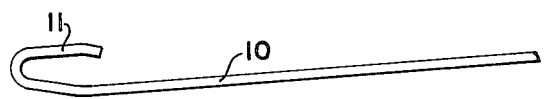
FIG. 5 is a side view of the hook end of a snake.
Figure 6:
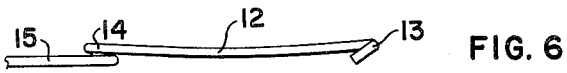
FIG. 6 is a side view of the shank portion of the connector attachment prior to mounting on the snake showing the manner in which the spring wire is bent.
Figure 7:
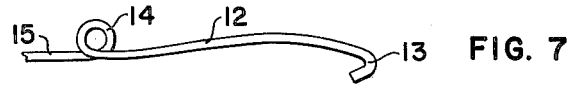
FIG. 7 is a top view of the shank structure of FIG. 6.

The invention according to the modification of FIGS. 1 to 8 provides for a connector attachment to a conventional snake or fish tape 10 having a hook 11 at one end to which the connector attachment, which also serves as a leader, is attached by its shank 12. The shank 12 includes a hook 13 at its free end and an eye 14 formed by a 540 degree bend snugly receiving the bight of the hook 11 of the snake. The wire forming the connector extends from the eye 14 to an integral hook shank 15 of a first hook 16, and continuing from the first hook the wire is bent on itself forming a second hook shank 17 of a second hook 18. From the second hook 18 the wire is bent back on itself forming a shank 19 of a third hook 20, the wire being bent back on itself from the third hook 20 forming the shank 21 of a fourth hook 22 completing the connector attachment.

It will be noted that the connector attachment is secured to the snake by first passing the hook 11 of the snake 10 through the eye 14 and then wrapping the shank 12 around the shank body of the snake 11, thereafter causing engagement of the hook 13 of the shank around the snake 10 against the tension or bias of the compound bends in the spring wire of the shank 12 securely attaching the connector attachment to the snake 10. The attachment is preferably made of spring wire that is resilient; the stiffness of the wire is preferably less than the stiffness of the snake to which it is attached, so that the conector serves as a leader to guide the hook end of the snake smoothly into bends in the conduit, which evidently lessen local pressures on the snake. In any case, it appears easier to push a snake equipped with the connector attachment of the present invention into and through a conduit than to insert a conventional snake. It will also be noted that the short leg or point of each hook is slightly bent toward the axis of the connector so that there is no danger of the points of the hooks hanging up on the ends of pipe sections in the conduit. The snakes are provided with the hook ends in which the point of the hook is slightly bent back toward the body of the snake. Therefore, a snake equipped with the connector of the present invention can be readily pushed or pulled through a conduit with a minimum of danger of positive hooking of the hooks with the interior of the conduit as the projecting point portions are rounded, providing a smooth guiding action over any surface encountered in the conduit.

Figure 8:
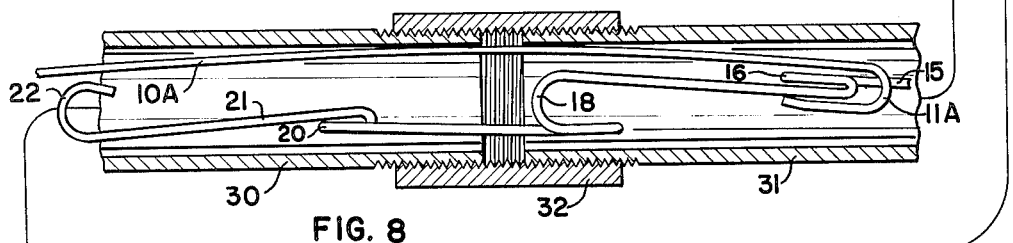
FIG. 8 is an enlarged diagrammatic sectional view of fragments of coupled conduit sections with the connector with its shank and supporting snake within the conduit illustrating how one of the hooks of the connector interengages with the hook of another snake and showing by single line a conduit with many bends.

Upon reference to FIG. 8, a conduit section 30 is connected to a conduit 31 by a coupling 32 in the usual manner and it is assumed that a first snake 10A has been bushed into the conduit assembly from one end 33 as far as possible, which is just beyond the coupling 32, so that its hook 11A is in the location shown in the drawing, for example, and thereafter the connector which is attached to a second snake (not shown in FIG. 8) is inserted through the other end 34 of the conduit assembly until the connector overlaps the hook 11A of the first snake. The second and first snake are relatively moved longitudinally with respect to each other and then the hook 11A engages one of the hooks 16, 18, 20, or 22 in the connector and further pulling on the snakes causes firm engagement. The snakes can then be moved longitudinally by pushing on one snake and pulling on the other until one snake has its end projecting from the end of the conduit assembly opposite the end from which the said one snake was inserted. The snakes are then separated from each other. An electric wire is then attached to the projecting end of the said one snake passing completely through the conduit assembly and the said one snake withdrawn causing the wire to be passed completely through the conduit assembly from one end 33 to the other end 34.

Figure 9:
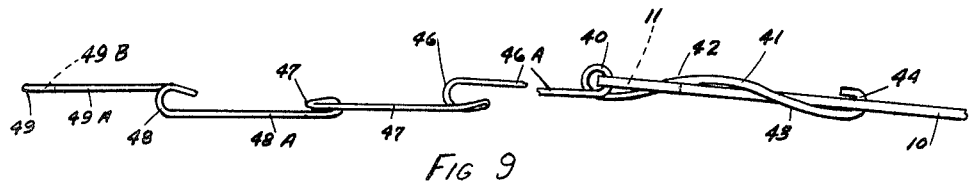
FIGS. 9 and 10 are bottom and side views of a connector on the hook end of a fish tape with the eye of the connector formed of a left handed helix.
Figure 10:
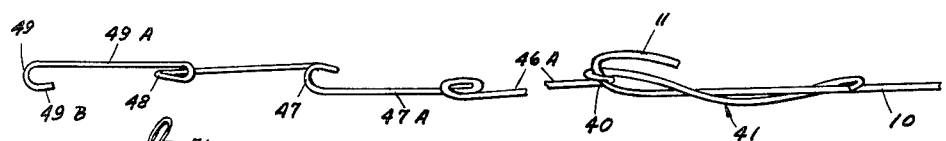

Upon reference to FIGS. 9 and 10 a modified form of connector for fish tapes is shown to include an elongated body of resilient material of circular section spring steel wire in which an eye 40 of a size to receive at least one hook 11 of a fish tape 10 is formed by helically bending the steel wire intermediate the ends thereof to provide a shank 41 extending from said eye 40 in one direction generally tangentially to said helical eye 40 and having a first bend 42 spaced from said eye 40 with a curvature opposite to curvature of the eye, and a second bend 43 spaced beyond said first bend from said eye with a curvature in the same direction as said eye. A hook 44 is provided at the extreme end of said shank 41 of a size to receive the body of the fish tape 10. It will be noted that this shank 41 with the eye 40, bends 42 and 43, and hook 44 provide for substantially one and a half turns of the shank 41 including the hook 43 around the body of the fish tape 10 thereby assuring more positive retention of the connector device to the fish tape than that afforded by the modification shown in FIGS. 1 through 8. It will also be noted that in the detached condition the shank assumes a position relative to the non-shank end similar to that shown in FIGS. 11 and 12, for example. The shank 41 as seen from the side in FIG. 12 including hook 43 may appear substantially as a straight line at an acuate angle to the axis of the helix of the eye 40 with a bend 45 at the helix showing the actute bend 43 as seen from the side may also appear as a bend as shown in FIG. 12, but it should be understood that the shank 41 may appear straight as seen from the side in FIG. 12 from the bend 45. In FIGS. 11 and 12 and FIGS. 1 through 8 the helical eye has a right hand twist while in the other figures the helical eye has a left hand twist. In each instance the shape is such that when the shank is attached to a fish tape the connector assumes axial alignment with the fish tape.

The connector of FIGS. 9 and 10 includes the non-shank multiple J-hook section by which the connector device can be connected to another fish tape 10A in the manner shown in FIG. 8.

From the eye 40 the stem 46A of a first J-shaped hook 46 extends in the opposite direction to shank 41 and generally tangent to the helical eye 40 in a plane substantially perpendicular to the axis of helical eye 40. The wire is bent back on itself along the short leg of J-shaped said wire being hook 46 providing the stem of long leg 47A of a second hook 47 in which the bight of the hook 47 extends at right angles to the bight of the hook 46 and with the stem 47A outwardly of the short leg of the hook 46. Similarly a third J-shaped hook 48 is formed with a stem 48A bent back along the short leg of hook 47 and outwardly thereof forming the stem of long leg 49A of a fourth hook 49 the short leg 49B of which is best slightly toward the stem 49A and the bight of the hook 49 is at right angles to hooks 48 and 46 and parallel to hook 47 but with the hook 49 opening in the opposite direction to hook 47. The hooks are shown as having their short legs bent toward the shanks, but the short legs can be substantially parallel to the shanks and work satisfactorily under same conditions.

Figure 13:
FIG. 13 illustrates the use of the wire lead puller as it projects from a conduit at a connection box with the hook end of the fish tape within the conduit.

Upon reference to FIG. 13 a wire lead puller 50 is shown attached to a fish tape 10 and partially in a conduit in position to have wires secured to the loop 51 to be drawn into and through the conduit 52 extending to a conventional connection box 53.

The wire lead puller includes an eye 40 intermediate its ends substantially similar to that shown in FIGS. 9 and 10 with the shank 41 and its hook 43 extending in one direction from the helical eye 40 (the helical eye being shown as being formed by a right hand helix).

The lead puller includes an elongated stem or body 54 having a pair of loops 55 and 56 formed in the free end portion thereof with the loops 55 and 56 having a common connecting bight portion 57 spaced from the outer ends of the loops 55 and 56, the free end portion of the elongated body interengaged with the stem 54 by twisting 58 back on the body inwardly of the loops 55 and 56 and then the free end is bent back upon itself forming a hook 59 which engages the common bight portion 57 of loops 55, 56 thereby supporting the loops against collapsing when the electrical wires are attached thereto and pulled in a conduit.

The lead puller as well as the connector devices serves as a guide for the fish tape with which it is used since the wire of the lead puller is less stiff than the material of the fish tape and therefore the lead puller acts as a flexible extension guide starting the end of the fish tape along the curvature of a conduit which has been already passed by the lead puller. It will be apparent that the loops 55 and 56 may be parallel to each other as shown or at right angles to each other and may be parallel or at right angles to the hook of the fish tape and to the eye 40 of the means for attachmen to the fish tape and thereby serve to further guide the fish tape in many irregular and curved portions of a conduit.

In each instance the means for attachment including the eye 40 and the shank 41 with the hooks 43 at the extreme end provides for mounting on any fish tape of a size suitable to be threaded through the eye 40. The interengagement of the shank 41 with the body of the fish tape assures a reduction of strain on the hook 11 of the fish tape and therefore increases the pulling strength of the fish tape before breakage of the hook 11 from the fish tape. Further action of reducing the strain on the hook 11 of the fish tape prevents the hook 11 from spreading within the conduit and prevents the extreme end of the hook from engaging the sides of the conduit even under severe strain encountered in pulling many wires simultaneously through the conduit.

Figure 14:
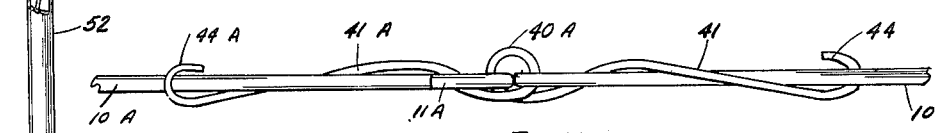
FIGS. 14 and 15 are top and side views of the coupling for two short fish tapes to provide a long fish tape.
Figure 15:
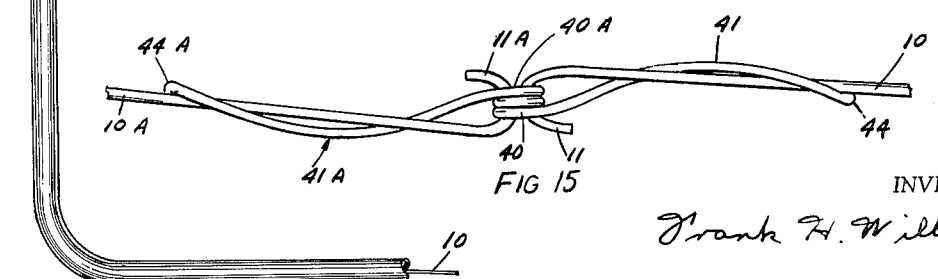

Upon reference to FIGS. 14 and 15 a connector for securing the hooked end of one fish tape 10 to the hooked end of another fish tape 10A is shown and the structure thereof is a duplication of that shown for the means to secure the connector device of FIGS. 9 and 10 to fish tape 10. It will be noted that the parts on the right are numbered identically to that shown in FIGS. 9 to 12 while the parts on the left are similarly numbered but with the suffix A after the reference numeral to avoid duplication of description. It will be apparent that the eye 40 or 40A is of a size to receive two hooks of similar fish tapes and the structure provides for connecting as many fish tapes as desired thereby making it possible for a mechanic to use short otherwise unusable fish tapes and to obtain the desired length, and also making it possible to avoid carrying a long fish tape for what may be a single long use and many short uses.

The connector of FIGS. 14 and 15 may be used for connecting many different elongated members and is suitable for use as a universal joint for the ends of shafts as the resiliency of the spring wire of which the connection device is made permits substantial flexing and the positive connection by means of the eye 40 and hooks 11 gives a positive driving relation in angular directions about the axis of the elongated members whether such members are fish tapes or rotating shafts or the like. It will be noted that the portion of the attaching shank 41 between the eye 40 and the bend 42 is located adjacent the free end of the hook 11 of the fish tape 10 and due to the fact that the shank 41 is wrapped around the body of the fish tape the eye 40 is urged away from the free end of the hook 11 and toward the main body of the fish tape thereby reducing the eccentric loading on the hook 11 and on the body of the fish tape. The connection device serve to take the pushing and pulling strain of the fish tapes without adversely affecting the use thereof.

Upon reference to FIGS. 16 to 18 a wire guide 60 is shown made of resilient elongated wire-like material with a plurality of wire guiding eyes 61 intermediate the ends thereof and having hooks 11B and 44B at the ends thereof with the hooks extending generally in opposite directions and corresponding to hook 11 of the fish tape 10 and to the hook 44 on the connector device respectively. A hook receiving eye 40B is provided adjacent the hook 44B with bends 42B and 43B between the hook 44B and eye 40B to provide for the interconnection between the hook end 11B and the shank end 41B. The connection of the ends of the wire guide results in the ring formation shown in FIGS. 17 and 19 and the wire guide can then be used to guide the individual wires 62 from packages 63 to a conduit 64 in parallel relation to assure that the wires do not cross as they are drawn into the conduit.

When more than five wires are to be guided two of the wire devices 60 are connected to form a larger wire guide ring as shown in FIG. 18 and the number can be increased as desired with each wire guide unit being connected to the other by the same connection means.

Figure 11:
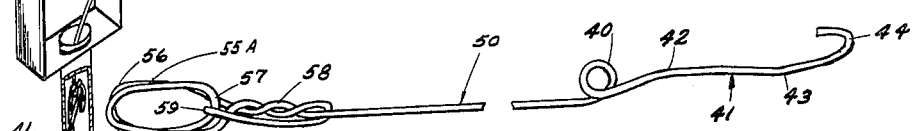
FIGS. 11 and 12 are top and side views of wire lead puller for attachment to the hook end of a fish tape with the eye formed by a right hand helix.
Figure 12:
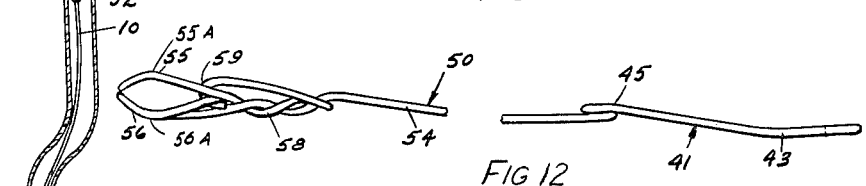

The wire guide after formation into the ring is used by first threading the wires 62 through the guide eyes 61 from the wire packages 63 and then to a lead puller 50 such as that shown in FIGS. 11 to 13. The ends of the wires are fastened to the lead puller 50 by suitably twisting the wires to the loops 55 and 56 thereof and then one electrician draws the fish tape 10 back through the conduit 64 as the other electrician guides the wires through the wire guide 60 successively moving the wire guide away from the conduit 64 toward the wire packages 63 thereby keeping the wires in generally parallel relation as the wires enter and pass through the conduit avoiding crossing of the wires and thereby avoiding any binding.

The invention also includes a carrying device for equipment comprising a hollow bent tubular body 65 with a bend 65A intermediate its ends and having a flange 66 closely adjacent the bend and at one end. A hollow smoke outlet member 67 having a spherical outer surface 67A of a width to cover the end of a conduit 68 or 69 in the connection box 70 is provided with a resilient extension coupling element 71 secured to hollow member 67 and having an inwardly extending flange at its upper end for snugly engaging the tubular member 65 above the flange 66 thereby providing a swivel connection between the tubular member 65 and the hollow member 67 so that the angular relation between the non-flanged end of the tubular member can be changed relative to the hollow member 67. One outer surface 67B of hollow member 67 may be substantially flat while the opposite outer surface 67C may be cylindrical so that the hollow member will be relatively thin between flat surface 67B and cylindrical surface 67C for accommodation between opposed conduit ends 68 and 69 in a connection box 70 as shown in FIG. 22. An interior bore 67D is provided in the hollow member 67 in communication with the sleeve 71 and hollow body 67 is provided with outlet openings 67E and 67F to the spherical and flat surfaces 67A and 67B respectively. One opening 67E is shown closed by a conventional bendable insulation covered electrical connection nipple type sleeve 72 while the other opening 67F has a cut off electrical connection nipple type sleeve device 73 placed therein so that the flaring end projects outwardly from the flat surface 67B to provide for guiding and retention of the flat surface in fluid tight contact with the end of the tubular conduit 69 and the outlet opening 67F in communication with conduit 69 as shown in FIG. 22. The connector 72 effectively closes the other outlet opening 67E. The electrician can inhale tobacco smoke from a cigarette 73A and blow the smoke through the bent tubular member 65 and hollow member 67 into the conduit 69 so the other end of the conduit can be located by the position where smoke is issuing as shown in FIGS. 22 and 24.

The bent tubular member 65 also serves as a container for the fish tape connector devices, lead puller 50, and wire guide 65 as shown in FIG. 23. To effectively close the upper end of the tubular body 65, a receptacle 74 is provided with a conventional electrical tubular conductor connection sleeve 75 with the inner end being secured in place through an opening in the bottom of receptacle 74 by the usual nut used to retain the connection sleeve in a connection box similar to that shown in FIG. 22. The tubular conduit receiving portion 75A of the connection sleeve 75 is adapted to receive the unflanged end of the tubular member 65 to which the sleeve is secured by the flanged nut 76 threaded on the external threads 75B of connection sleeve 75. A split ring 77 serves to clamp the tubular member 65 as the nut 76 is drawn up on the sleeve 75 so that the split ring 77 engages the tapering surfaces 75C and 76A of the sleeve 75 and nut 76 respectively and clampingly engages tube 65 in a well known manner. A wall is placed within the sleeve 75 adjacent the upper end to prevent articles in the receptacle from passing downwardly through the tubular member 65.

The receptacle 75 is adapted to retain electrical wire connection devices 72 and is provided with an open top having internal threads and a closure 78 having external threads for closing the top and retaining the connectors 72 therein, a chain 79 of the swivel type being provided between the closure 78 and the receptacle 74 to prevent loss thereof while permitting the relative rotation between closure 78 and receptacle 74.

The bent tubular member is of sufficient length to provide for ease of use with electrical connection boxes as shown in FIGS. 22 and 24. To provide means to attach the smoke blower to the belt 80 of the electrician a spring clip device shown in FIG. 25 is provided which includes a helical spring portion 81 from which reversely curving clamping portions 81A and 81B project with the clamping portion 81B continuing along a substantially straight line 81C to a belt engaging section 81D terminating in an eye 81E. The clamping portion 81A has a straight extension 81F and a loop formed by sections 81G and 81H which loop surrounds section 81C to limit the relative movement of the clamping portions 81A and 81B. A belt engaging section 81I extends from 81H and terminates in an eye 81J. The clamping action between 81A and 81B provides for securing the receptacle alone or the smoke blower body 65 alone or the combination of smoke blower and receptacle to the belt 80 of the electrician.

The eyes 81E and 81J may be made as hooks so that such hooks will engage the under edge of the belt 80 thereby assuring positive retention of the clamp on the electrician's belt.

The smoke blower and the electrical wire connectors are readily available to the electrician as well as the fish tape connector devices and therefor the smoke blower performs multiple functions and is always available for use where needed without requiring the carrying of excessive equipment or tool boxes.

Upon reference to FIGS. 23 and 24, a modification of smoke blower is shown as including the flanged tube 65 in which the flanged end 66 of the tube extends into a hollow spherical member 82 which may be a rubber ball, for example. A collar 83 is provided on the spherical member to retain the radial relation of the bent tubular section 65 and to additionally assure fluid tight relation therebetween. A single outlet opening 84 is shown in the spherical member with a cut electrical wire connector 73 projecting therefrom.

The projecting portion of the cut electrical wire connection device 74 enters the end of the conduit and positively assures that the opening thereof is in communication with the conduit thereby avoiding much visual inspection which is difficult if not impossible in many cases. The tubular body 65 is swivelly connected to the spherical member 82 so that different angular relations can be obtained by the relative angular movement of the spherical member with respect to the tubular member 65 as previously explained.

In FIG. 24, the use of the smoke blower is shown in which a cigarette 73A provides smoke to the electrician 85 who blows smoke through smoke blower 65, 82 to a conduit 86 in box 87 and the smoke issues from the other end of the conduit 86 thereby locating the other end of the conduit.

It will thus be seen that with applicant's invention it is unnecessary to twist the fish tapes in an effort to get the hooks to interengage as the connection device has four hooks at different angles to each other with the hooks opening in four different directions. Consequently in practically every instance it is only necessary to have the connection device on one fish tape overlap the hook of the other fish tape and upon pulling on either fish tape the hook of the other fish tape interengages one of the hooks on the one fish tape positively and either one of the fish tapes can be completely drawn through the conduit by pushing on one fish tape while pulling on the other. The wires are secured to the drawn through fish tape and the installation completed in a minimum of time with a minimum of effort.

It will be apparent that various changes can be made within the spirit and scope of the present invention as set forth in the valid interpretation of the appended claims.

What is claimed is:

1. An electrical wire lead puller comprising an elongated resilient wire-like body, means at one end of said elongated body for attachment to the hooked end of a fish tape, said elongated body extending from said means of attachment a substantial distance to provide an extension from the hooked end of the fish tape sufficient to project from the end of a conduit and outwardly from a connection box on the end of the conduit while the means for attachment of the lead puller and the hook of the fish tape lie within the conduit, a double elongated loop means formed at the end of said body opposite the means for attachment to the fish tape, the free end portion of the body being twisted back on the body and having a hook formed on the extreme free end thereof interengaging with the inner end of the elongated loop means on said body whereby the loop means is prevented from collapse and the strength of the loop means is enhanced so the fish tape can be used to pull wires into and through the conduit in which the fish tape is located.

2. The lead puller according to claim 1 in which each loop of the loop means is elongated in the direction of the body and the portion of each loop between the body and midway of its length diverges from the portion of the other loop between the body and midway of its length in a direction away from the body, and the portion of each loop between midway of the length thereof and the free end thereof converges toward the portion of the other loop to substantially touching relation to space the free end of the lead puller from the sides of a conduit in which the lead puller is used.

3. The lead puller according to claim 1 in which the portion of each loop of the loop means between the body and intermediate the length of the loop diverges from the portion of the other loop between the body and intermediate its length in a direction away from the body, and the portion of each loop between intermediate the length of the loop and the free end thereof converges toward the portion of the other loop into close adjacent relation to space the free end of the lead puller from the sides of a conduit in which the lead puller is used.

References Cited by the Examiner

UNITED STATES PATENTS

| 235,735 | 12/1880 | Brooks | 254—134.3 |
| 408,574 | 8/1889 | Brooks | 254—134.3 |
| 1,157,747 | 10/1915 | Winter | 24—139.1 |
| 1,672,324 | 6/1928 | Kepler. | |

(Other references on following page)

UNITED STATES PATENTS

| | | | |
|---|---|---|---|
| 1,757,496 | 4/1930 | Marr et al. | 116—114.7 |
| 2,318,238 | 5/1943 | Linville | 24—3 |
| 2,322,825 | 6/1943 | Carlson | 242—157 |
| 2,377,173 | 5/1945 | Nelson | 242—157 |
| 2,509,100 | 5/1950 | Jordan. | |
| 2,600,722 | 6/1952 | Atkinson. | |
| 2,727,720 | 12/1955 | Barth. | |
| 2,775,804 | 1/1957 | Ayoub | 24—3 |
| 2,809,606 | 10/1957 | Bates | 116—114.7 |
| 2,968,076 | 1/1961 | Chanko | 24—3 |
| 3,035,817 | 5/1962 | Wilson. | |
| 3,041,043 | 6/1962 | Harden. | |

WILLIAM FELDMAN, *Primary Examiner*.